United States Patent

Hullmann et al.

[11] Patent Number: 5,099,549
[45] Date of Patent: Mar. 31, 1992

[54] RETAINING CLIP

[75] Inventors: Klaus Hullmann, Lorrach; Ingo Klamm, Weil/Rh, both of Fed. Rep. of Germany

[73] Assignee: A. Raymond et cie., Grenoble, France

[21] Appl. No.: 745,852

[22] Filed: Aug. 16, 1991

[30] Foreign Application Priority Data

Aug. 25, 1990 [DE] Fed. Rep. of Germany ....... 4026922

[51] Int. Cl.⁵ .............................................. A44B 21/00
[52] U.S. Cl. ...................................... 24/295; 24/289; 24/293
[58] Field of Search .................. 24/295, 292, 293, 289

[56] References Cited

U.S. PATENT DOCUMENTS

| | | | |
|---|---|---|---|
| 2,180,925 | 11/1939 | Dyresen | 24/295 |
| 2,246,720 | 6/1941 | Churchill | 24/295 |
| 2,500,377 | 3/1950 | Poupitch | 24/295 |
| 2,670,512 | 3/1954 | Flora | 24/289 |
| 3,205,546 | 9/1965 | Nelson | 24/295 |

*Primary Examiner*—Victor N. Sakran
*Attorney, Agent, or Firm*—Finnegan, Henderson, Farabow, Garrett & Dunner

[57] ABSTRACT

A retaining clip for fastening a construction part to a carrier plate, in which the retaining clip has a supporting plate that rests on the carrier plate, a clamping tab for holding the part to the clip and a compressible fastening sleeve formed of two sleeve wall halves for anchoring the clip in a hole in the carrier plate. At least one of the sleeve halves has a pair of outwardly projecting, resiliently compressible hooks that pass through the hole and then engage the plate from behind when the sleeve of the clip is pressed into the hole to hold the clip in place, and a pair of tabs adjacent the hooks that project outwardly beyond the edges of the hole on the front side of the carrier plate, so that when the tabs are squeezed together, the hooks will be released and the clip can be readily removed.

3 Claims, 2 Drawing Sheets

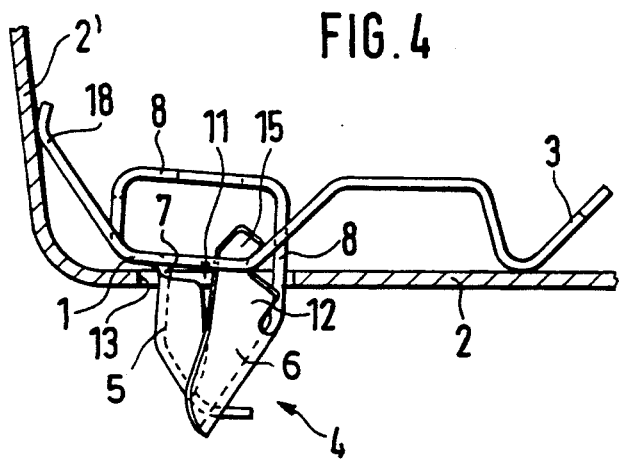
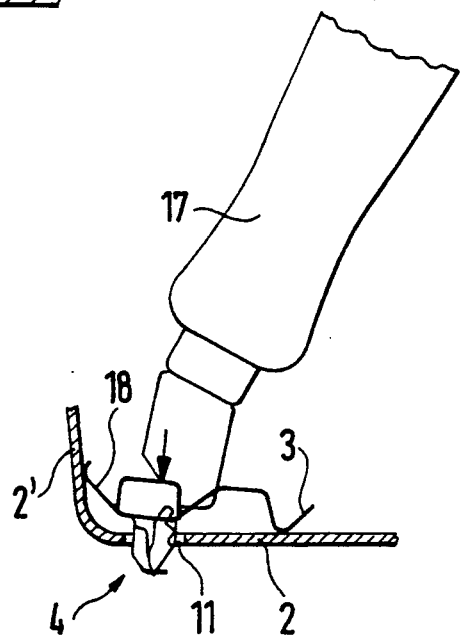
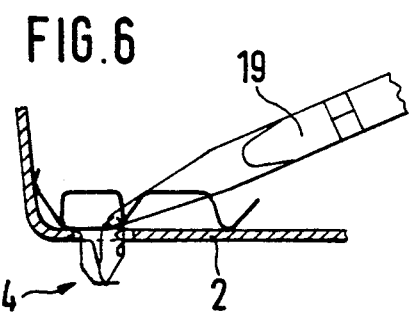
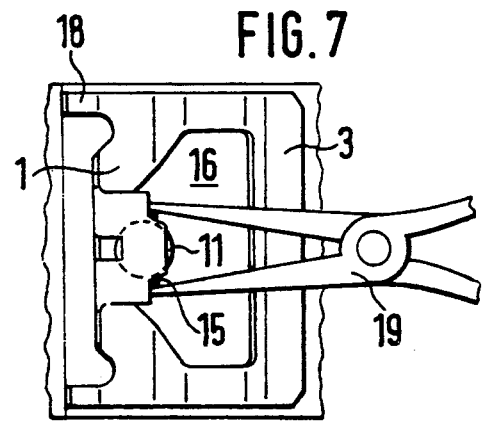
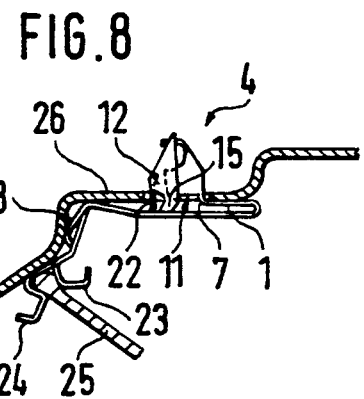

RETAINING CLIP

BACKGROUND OF THE INVENTION

This invention relates to a retaining clip for fastening construction parts to carrier plates. More particularly, it relates to clips for fastening trim elements to the body panels of motor vehicles.

Clips of this type are shown in U.S. Pat. No. 2,500,377. These clips hold protective or decorative molding or strips on motor vehicles and are anchored in place by means of a split fastening sleeve that fits in appropriately placed holes in the body or doors of the vehicles. However, a disadvantage of these clips is that they can be removed only by compressing the fastening sleeve from the rear side, so that their fastening hooks can then pass unimpeded out the hole. To do this, it is usually necessary to remove any trim panels from inside the vehicle beforehand to gain access to the sleeves. If the clip is used at locations where the fastening sleeve cannot be reached from behind, then all that can be done to remove it is to destroy it completely. Experience has shown, however, that the edges of the fastening hole are then adversely affected and under certain circumstances can even become unusable.

An object of the present invention, therefore, is to design a fastening sleeve for the above-mentioned retaining clip in such a way that it can be subsequently removed or dismounted from the assembly side, without damaging the edges of the fastening hole.

SUMMARY OF THE INVENTION

This object is achieved, in accordance with the present invention by providing in a retaining clip for fastening a construction part to a carrier plate having a supporting plate that rests on the carrier plate, at least one clamping tab for holding the part to the clip and a compressible fastening sleeve formed of two sleeve wall halves for anchoring the clip in a hole in the carrier plate, in which at least one of said sleeve halves has a pair of outwardly projecting, resiliently compressible hooks adapted to pass through the hole and then engage the plate from the underside when the sleeve of the clip is pressed into the hole to hold the clip in place, the improvement comprising a pair of tabs on said at least one sleeve half adjacent said hooks that project outwardly beyond the edges of the hole on the front side of the carrier plate when the clip is in place, said supporting plate of said clip having an opening in the region around said tabs to permit access to them, whereby squeezing of the tabs together will release the hooks and permit the clip to be removed.

BRIEF DESCRIPTION OF THE DRAWINGS

Preferred exemplary embodiments of the invention are illustrated in the drawings and will be explained in more detail below. In the drawings:

FIG. 4 shows the retaining clip in an installed position;

FIG. 5 is a side view of the retaining clip during installation;

FIG. 6 is a side view of the retaining clip during removal;

FIG. 7 is a top view of the retaining clip during removal; and

FIG. 8 is a side view of another embodiment of the retaining clip in an installed position.

DETAILED DESCRIPTION OF THE INVENTION

Figure 1:
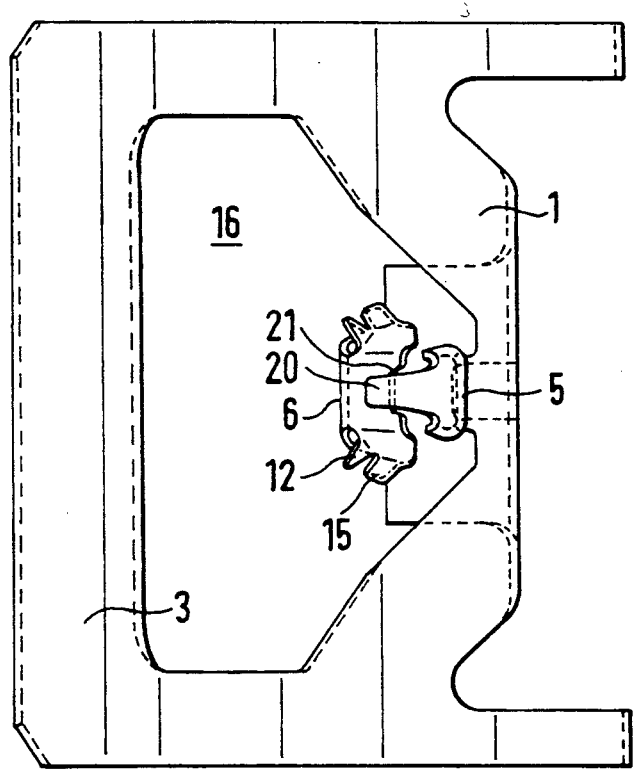
FIG. 1 is a bottom view of one embodiment of a retaining clip having a fastening sleeve of the present invention.

The retaining clips shown in the drawings are used, in general terms, to fasten construction parts to carrier plates and particularly to fasten trim elements to the body panels of motor vehicles.

The retaining clip includes a supporting plate 1 that rests on a carrier plate 2 and a clamping tab 3 which also rests on the carrier plate 2 and which serves to hold a construction part (not shown), such as, for example, a trim panel or a decorative piece of molding (See FIG. 4).

On the underside of supporting plate 1 is a downwardly projecting fastening sleeve 4 formed from two sleeve wall halves 5 and 6. One sleeve wall half 5 is connected directly to the supporting plate 1 via a downwardly angled web 7, while the other sleeve wall half 6 is suspended from it by being connected to the supporting plate 1 in a "roundabout" way via a multiple, angled resilient web 8 that bridges the region of the fastening sleeve 4. These two sleeve wall halves 5 and 6 as well as web 8 are punched out of the sheet-metal strip used to make the clip and are then bent into an approximately closed sleeve shape as shown so that their mutually opposite sleeve wall parts 9 and 10 taper downwardly toward a point.

Formed on the lower wall part 9 of sleeve 5 is a short tab 20 which penetrates into a correspondingly wide cutout 21 at the lower end of the wall part 10 of sleeve 6, so that the two sleeve wall halves 5 and 6 are centered relative to one another, but can also move resiliently towards one another.

Figure 2:
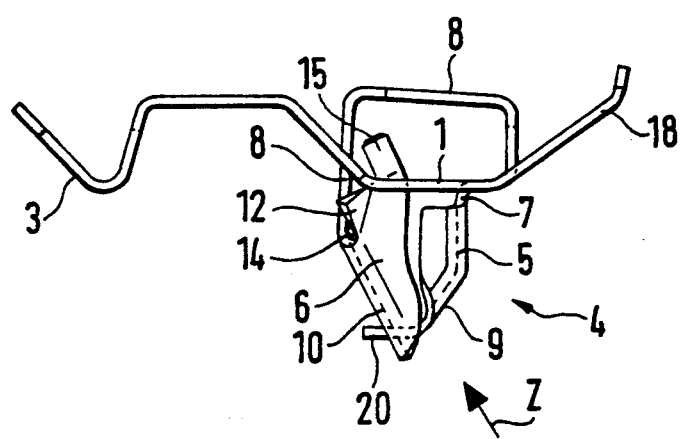
FIG. 2 is a side view of the retaining clip of FIG. 1.
Figure 3:
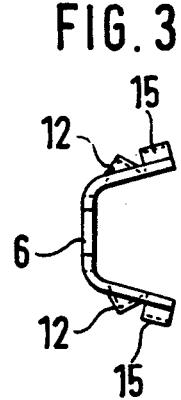
FIG. 3 is a partial view of the fastening sleeve of the clip taken in the direction "Z" in FIG. 2.

As shown in FIGS. 1-3, hooks or noses 12 are provided on either side of suspended sleeve wall half 6 that project laterally outward below the level of supporting plate 1. These hooks are positioned to lock behind the edges 13 of a hole 11 in carrier plate 2 when the clip is installed in the plate by pushing it fastening sleeve 4 down into the hole to lock it in place. In accordance with the invention, immediately next to these hooks 12 and projecting outwardly from the upper regions of sleeve wall half 6 above the level of supporting plate 1 are dismounting tabs 15. These tabs extend beyond the side edges 13 of the front side of hole 11 when the hooks 12 are engaged behind the carrier plate. Supporting plate 1 of the clip has an open space 16 in the region around the dismounting tabs 15 to accommodate and provide access to them.

FIG. 5 shows the retaining clip during installation. To make installation easier, fastening sleeve 4 of the clip is pressed with a small hand tool 17 down into hole 11 in carrier plate 2. During installation, the suspended sleeve wall half 6 is pushed towards wall 5 until the hooks 12 pass by the edges 13 of hole 11, after which wall 6 will spring back to hold the clip in place. Furthermore, resilient web 8 is designed to draw up on sleeve wall 6 to firmly engage hooks 12 with the underside of plate 2 and against the action of resilient clamping tab 3. In the embodiment illustrated, the retaining clip is supported resiliently on the side opposite clamping tab 3 by means of two supporting tabs 18 that rest on an angled side wall 2' of the carrier plate 2. FIG. 4 shows the clip in its intended installed position.

As shown in FIGS. 6 and 7, to remove the retaining clip, the dismounting tabs 15, projecting outwardly from the upper sides of fastening hole 11, are compressed towards each other by means of flat or long-nose pliers 19 until the hooks or noses 12 are free from the edges 13 of the hole 11 and the sleeve 4 of the clip can be drawn out of the hole. Recess 16 is of a size such that flat pliers 19 can be easily applied from the side at a low inclination and the dismounting tabs 15 grasped firmly.

Thus with tabs 15 it is possible, after removing the trim elements, to release the retaining clip simply by compressing the tabs together by means of a conventional tool. The hooks or noses forming part of the same sleeve on which the tabs are formed are thereby pressed inwards until the fastening sleeve easily comes free.

The use of the dismounting tabs 15 is not restricted to the design of the fastening sleeve 4 shown in FIGS. 1 to 7, but, as is evident from FIG. 8, can also be used in split fastening sleeves in which the sleeve wall halves that are punched out of the recess are bent towards one another by singly angled webs 7 and 22.

This type of retaining clip is employed in the roof region of a motor vehicle and possesses two clamping tabs 23 and 24, into which the retaining web 25 of a side trim piece (not shown) is inserted. The fastening sleeve 4 of this retaining clip is anchored in a hole of the roof plate 26 in the same way as in the above-mentioned embodiment and can also be released again by means of the flat pliers in the same way.

What we claim is:

1. In a retaining clip for fastening a construction part to a carrier plate, in which the retaining clip has a supporting plate that rests on the carrier plate, at least one clamping tab for holding the part to the clip and a compressible fastening sleeve formed of two sleeve wall halves for anchoring the clip in a hole in the carrier plate, in which at least one of said sleeve halves has a pair of outwardly projecting, resiliently compressible hooks adapted to pass through the hole and then engage the plate from the underside when the sleeve of the clip is pressed into the hole to hold the clip in place, the improvement comprising a pair of tabs on said at least one sleeve half adjacent said hooks that project outwardly beyond the edges of the hole on the front side of the carrier plate when the clip is in place, said supporting plate of said clip having an opening in the region around said tabs to permit access to them, whereby squeezing of the tabs together will release the hooks and permit the clip to be removed.

2. The retaining clip of claim 1, wherein the hooks are provided on the upper edge of a single sleeve wall half and these extend in the same direction as the clamping tab of the retaining clip.

3. The retaining clip of claim 2, wherein said single sleeve wall half is suspended from the supporting plate of the clip by a multiple angled resilient web that pulls the hooks up against the underside of the carrier plate when the fastening sleeve of the clip is pressed into the hole.

* * * * *